United States Patent
Wang et al.

(10) Patent No.: US 10,341,639 B2
(45) Date of Patent: Jul. 2, 2019

(54) AUTOMATICALLY SCANNING AND REPRESENTING AN ENVIRONMENT WITH COLLISION AVOIDANCE

(71) Applicant: ABB Technology AG, Zurich (CH)

(72) Inventors: Jianjun Wang, West Hartford, CT (US); Biao Zhang, West Hartford, CT (US); Carlos Martinez, South Windsor, CT (US); Carlos W. Morato, Avon, CT (US); Remus Boca, Simsbury, CT (US); Thomas Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 22 days.

(21) Appl. No.: 14/941,838

(22) Filed: Nov. 16, 2015

(65) Prior Publication Data

US 2017/0138192 A1    May 18, 2017

(51) Int. Cl.
*H04N 13/204* (2018.01)
*E21D 9/00* (2006.01)
*E21B 7/02* (2006.01)
*G05D 1/02* (2006.01)

(52) U.S. Cl.
CPC ........... *H04N 13/204* (2018.05); *E21B 7/022* (2013.01); *E21D 9/006* (2013.01); *G05D 1/0248* (2013.01); *G05D 2201/021* (2013.01)

(58) Field of Classification Search
None
See application file for complete search history.

(56) References Cited

U.S. PATENT DOCUMENTS

| 5,111,401 A | 5/1992 | Everett, Jr. et al. |
| 5,502,638 A | 3/1996 | Takenaka |
| 7,069,124 B1 * | 6/2006 | Whittaker ............ G05D 1/0225 701/28 |

(Continued)

FOREIGN PATENT DOCUMENTS

| WO | WO 2013098459 A1 * | 7/2013 | ............. E21D 20/00 |
| WO | WO-2013098459 A1 * | 7/2013 | ............. E21D 20/00 |
| WO | WO 2015106799 A1 * | 7/2015 | ............. G01S 17/42 |

OTHER PUBLICATIONS

Wang et al., "Automatically Scanning and Representing an Environment Having a Plurality of Features" U.S. Appl. No. 14/941,826, filed Nov. 16, 2015.

(Continued)

*Primary Examiner* — Lindsay J Uhl
(74) *Attorney, Agent, or Firm* — J. Bruce Schelkopf; Taft Stettinius & Hollister LLP (57) ABSTRACT

Automatic scanning and representing an environment with collision avoidance includes, for example, obtaining a first representation of the environment using a first scanning path, determining a second scanning path based on the first representation of the environment operable to avoid contact with the environment when obtaining a second representation of the environment, obtaining the second representation of the environment based on the second scanning path, and wherein the second representation of the environment is different from the first representation of the environment. The method may be employed in imaging and/or representing a rock wall having a plurality of spaced-apart holes for receiving charges for mining.

14 Claims, 8 Drawing Sheets

(56) References Cited

U.S. PATENT DOCUMENTS

| | | |
|---|---|---|
| 2009/0087029 A1 | 4/2009 | Coleman et al. |
| 2009/0157233 A1 | 6/2009 | Kokkeby et al. |
| 2009/0319112 A1 | 12/2009 | Fregene et al. |
| 2010/0098327 A1* | 4/2010 | Se .................. G01C 11/06 382/154 |
| 2010/0315505 A1 | 12/2010 | Michalke et al. |
| 2011/0137458 A1 | 6/2011 | Hisatani et al. |
| 2012/0024605 A1 | 2/2012 | Elinas et al. |
| 2012/0239191 A1* | 9/2012 | Versteeg .............. G06N 3/004 700/246 |
| 2015/0253775 A1 | 9/2015 | Jacobus et al. |
| 2017/0067341 A1* | 3/2017 | Baiden .................. B25J 11/00 |

OTHER PUBLICATIONS

Wang et al., "Facilitating Robot Positioning" U.S. Appl. No. 14/941,823, filed Nov. 16, 2015.
Wang et al., "Three-Dimensional Visual Servoing for Robot Positioning" U.S. Appl. No. 14/941,832, filed Nov. 16, 2015.
Bonchis et al., Robotic Explosive Charging in Mining and Construction Applications, IEEE Transactions on Automation Science and Engineering, vol. 11, No. 1, 6 pages, Jan. 2014.
International Search Report and Written Opinion for PCT International Application No. PCT/US2016/062277, completed Feb. 3, 2017, 8 pages.

* cited by examiner

AUTOMATICALLY SCANNING AND REPRESENTING AN ENVIRONMENT WITH COLLISION AVOIDANCE

FIELD OF THE DISCLOSURE

This disclosure relates generally to imaging environments, and more specifically, to automatically representing an environment while avoiding contact with the environment such as representing a rock wall having a plurality of spaced-apart holes for receiving charges for mining.

BACKGROUND

In the charging process for underground mine production, a primer and detonator are inserted into holes drilled in the walls and explosive material is pumped into holes. Operators need to work on the charging process at the production front. The charging process includes preparing wires, assembling detonator packages, inserting the charge hose into each of the holes, pumping the explosives into the holes, and retracting the hose after the explosive is pumped into the holes. The process is not safe, ergonomic and cost efficient. The production front environment also contains many hazards, such as wall collapses, accidental explosions, rock bursts, etc.

An attempt at automating the charging process is disclosed in "Robotic Explosive Charging In Mining And Construction Applications" by A. Bonchis, E. Duff, J. Roberts, and M. Bosse, IEEE Trans. Autom. Sci. Eng., vol. 11, no. 1, pp. 245-250, January 2014.

There is a need for further imaging of environments, and more specifically, to automatically representing an environment while avoiding contact with the environment such as representing a rock wall having a plurality of spaced-apart holes for receiving charges for mining.

SUMMARY

In a first aspect, the present disclosure provides a computer-implemented method which includes obtaining a first representation of an environment using a first scanning path, determining a second scanning path based on the first representation of the environment operable to avoid contact with the environment when obtaining a second representation of the environment, obtaining the second representation of the environment based on the second scanning path, and wherein the second representation of the environment is different from the first representation of the environment.

In a second aspect, the present disclosure provides a system which includes a memory, and a physical processor in communication with the memory, wherein the system is configured to perform a method. The method includes obtaining a first representation of an environment using a first scanning path, determining a second scanning path based on the first representation of the environment operable to avoid contact with the environment when obtaining a second representation of the environment, obtaining the second representation of the environment based on the second scanning path, and wherein the second representation of the environment is different from the first representation of the environment.

In a third aspect, the present disclosure provides a computer program product which includes a non-transitory computer readable storage medium readable by a processor and storing instructions for execution by the processor for performing a method. The method includes obtaining a first representation of an environment using a first scanning path, determining a second scanning path based on the first representation of the environment operable to avoid contact with the environment when obtaining a second representation of the environment, obtaining the second representation of the environment based on the second scanning path, and wherein the second representation of the environment is different from the first representation of the environment.

Additional features and advantages are realized through the concepts of the present disclosure. Other embodiments and aspects of the disclosure are described in detail herein and are considered a part of the claims.

BRIEF DESCRIPTION OF THE DRAWINGS

Various aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

The present disclosure addresses and enhances, inter alia, obtaining a representation of an environment while avoiding collision with the environment. In one embodiment, the technique of the present disclosure may include obtaining a first limited representation of an environment using a first limited scanning path or prescan from a safe location, using the limited representation to determine a second scanning path of the environment for obtaining a more robust representation of the environment while avoiding collision with the environment. As described in greater detail below, the first and second representations may be different, for example, may be obtained at different locations or regions, at different resolutions, and/or at different speeds. As further described below, the technique of the present disclosure may be employed in robotic or automated charging of holes in mining wherein the environment may include a rock wall having a plurality of holes defining axes for receiving charges for mining, and the obstructing structure may include sidewalls, a ceiling, and/or the ground.

Figure 1:
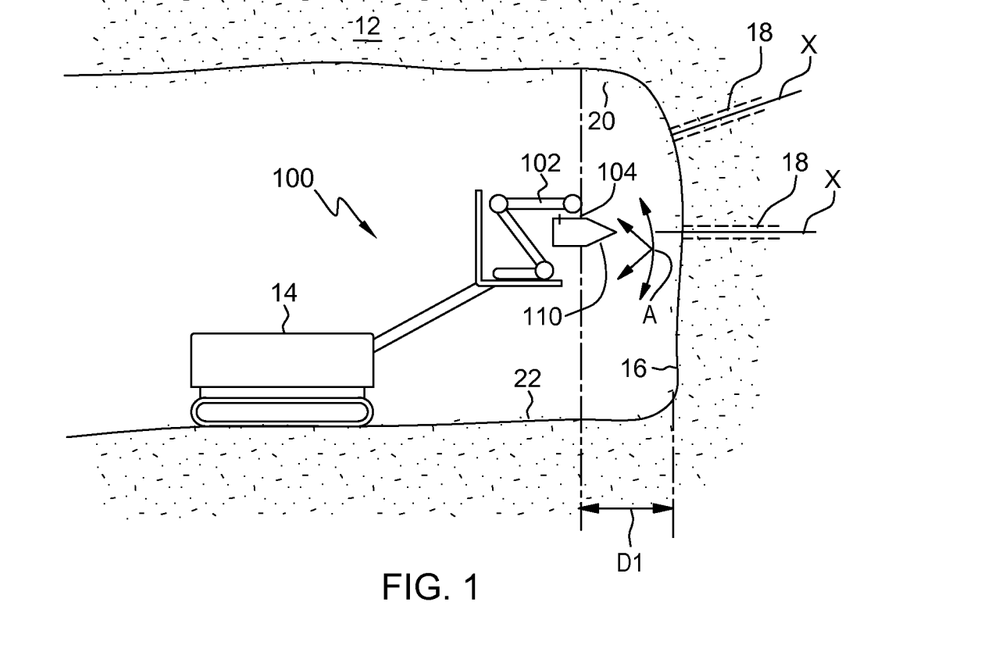
FIG. 1 is a diagrammatic illustration of an imaging system for use in representing an environment with collision avoidance in accordance with aspects of the present disclosure such as for representing a rock wall having a plurality of drill holes.
Figure 2:
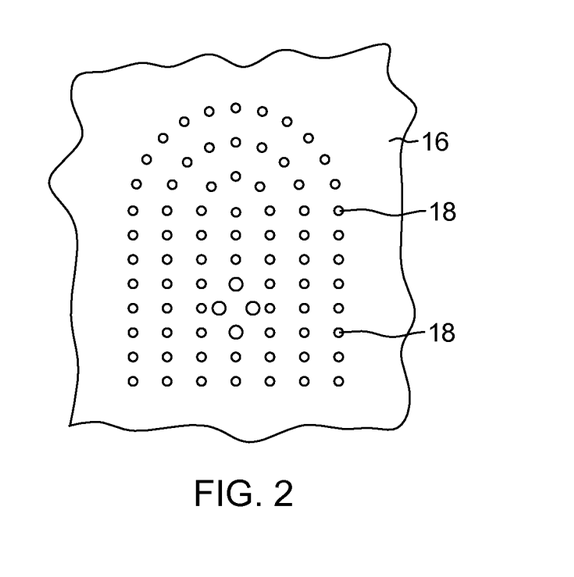
FIG. 2 is a front view of the wall of FIG. 1 illustrating the plurality of drill holes.

FIG. 1 is a perspective view of an imaging system 100 in accordance with aspects of the present disclosure for imaging an environment. In this exemplary embodiment, imaging system 100 may be used with the charging of holes in mining. For example, imaging system 100 may be employed in underground mining 12 and may generally include a robot 102 having an imager or camera system 104 supported on a suitable mounting assembly or movable carrier 14 for imaging a wall 16 having a plurality of holes 18 (only two of which are illustrated in FIG. 1). As shown in FIG. 2, wall 16 may include a plurality of holes 18 defining a drill hole pattern. While reference to the imaging system is made in the context of robotic or automated charging of holes in mining, it will be readily appreciated by those skilled in the art that the technique of the present disclosure is applicable to other situations where imaging is needed of an environment with one or more obstructions. In addition, imaging system 100, operable for imaging and locating a plurality of drill holes extending into a wall, may be part of a robotic system operable for charging the located plurality of holes.

Figure 3:
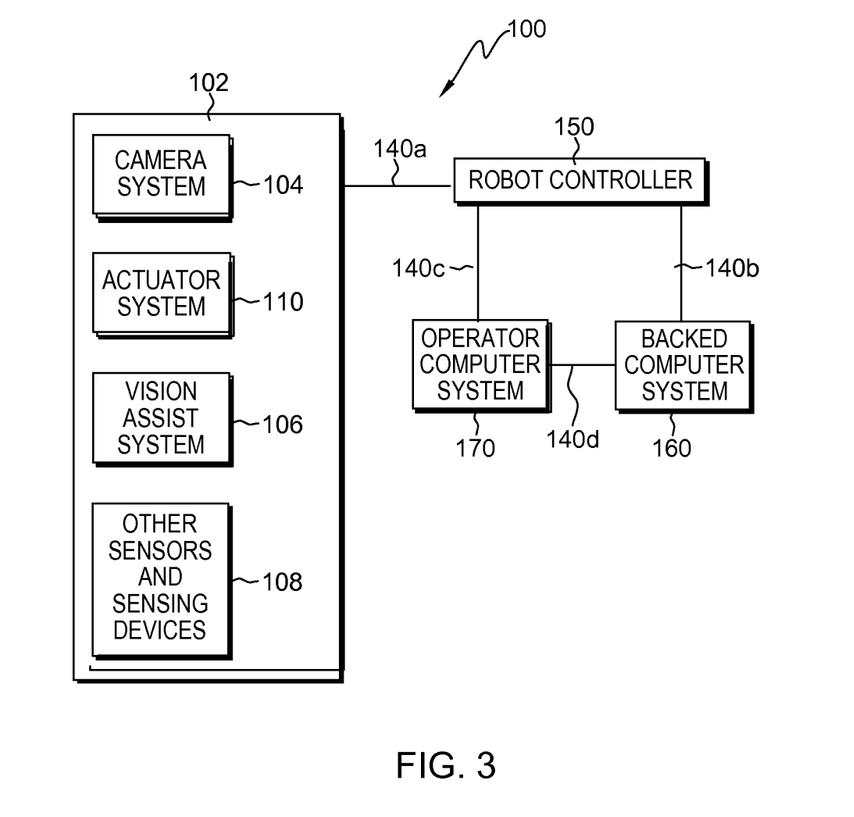
FIG. 3 is a block diagram of the imaging system of FIG. 1.

With reference to FIG. 3, imaging system 100 may generally include robot 102 operably connected to a robot controller 150, an operator computer system 170, and a backend computer system 160, which are operably coupled via communication links 140. Robot 102 may include camera system 104, an end effector or actuator 110, a vision assistance system 106, and other sensor/sensor devices 108. The components and operation of imaging system 100 are described in greater detail below.

With reference again to FIG. 1, the technique of the present disclose includes a first imagining of the environment. In this illustrated embodiment, the first imagining is performed of wall 16 and surrounding structure desirably from a safe location or distance and in a manner to avoid collision between robot 102 and wall 16, a ceiling 20, a ground 22, and the sidewalls disposed in and out of the plane of FIG. 1. For example, an operator may locate the robot safely away from wall 16, ceiling 20, ground 22, and the sidewalls. A first imaging or representation may be performed using a first scan path. For example, robot 102 may be operated so that camera system 104 moves in a first scan path to traverse or move about a limited region and desirably avoid contact with the environment. For example, camera system 104 may be operably moved or rotated about a generally fixed point or relatively small region or volume, e.g., in the directions of the illustrated double-headed arrows A in FIG. 1 to provide a first imaging or representation of the environment. The first imaging or representation may be a first location relative to the wall, the ceiling, the ground, and the sidewalls, e.g., at a distance D1 from the wall. In addition, the first imaging or representation may be a first resolution and/or at a first scanning speed.

As described in greater detail below camera system 104 may be operable for providing 2-dimensional, 3-dimensional, and/or depth-sensing imaging capabilities for obtaining the first imaging or representation including data regarding the spatial position and other geometric information of the environment in 3-dimensional space. For example, the first representation of the environment along the first scanning path may include merging together data, e.g., using such 3D meshing algorithms or 3D point cloud processing system, or other suitable processing, from a first plurality of images or data of portions of the environment such as wall 16, ceiling 20, ground 22, and/or the side walls.

A second scanning path based on the first representation of the environment is determined for obtaining a second representation which second scanning path is operable to avoid contact between robot 102 and the environment.

Figure 4:
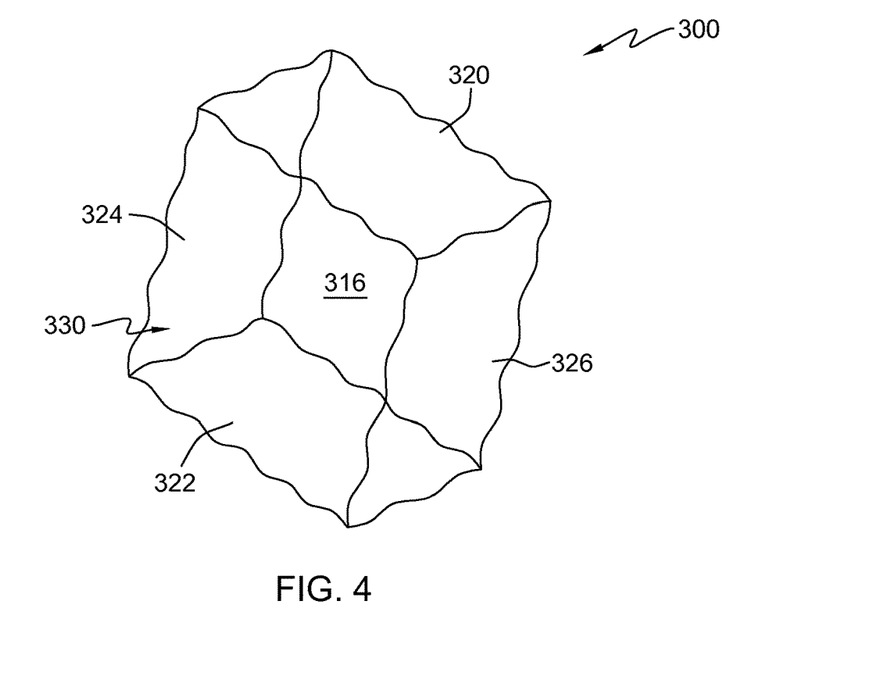
FIG. 4 is a diagrammatic illustration of the a bounding box for use in the robotic system of FIG. 1.

As shown in FIG. 4, in one embodiment the first representation may result in a generated bounding box 300 using imaging from the first scanning path of the environment. A second scanning path may be based on bounding box 300. For example, bounding box 300 may include a surface 316 corresponding to wall 16 (FIG. 1), a surface 320 corresponding to ceiling 20 (FIG. 1), a surface 322 corresponding to the ground 22 (FIG. 1), and surfaces 324 and 326 corresponding to the sidewalls of underground mining 12 (FIG. 1). The various surfaces of the bounding box may define a volume 330. In another embodiment, instead of surfaces, coordinates of the corners may be generated based on the first representation of the environment to define a bounding box.

Figure 5:
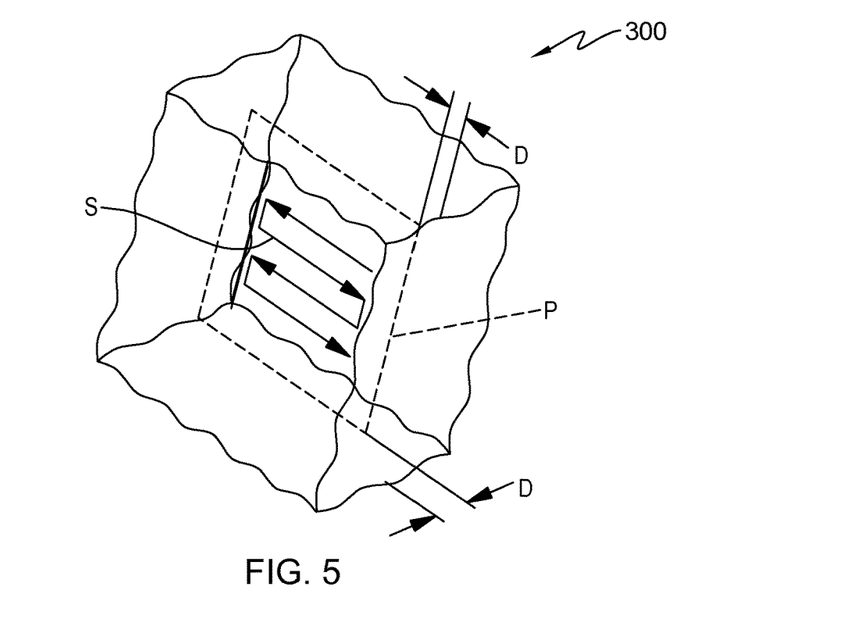
FIG. 5 is a diagrammatic illustration of the bounding box of FIG. 4 illustrating a plane for use in determining a second scanning path.
Figure 6:
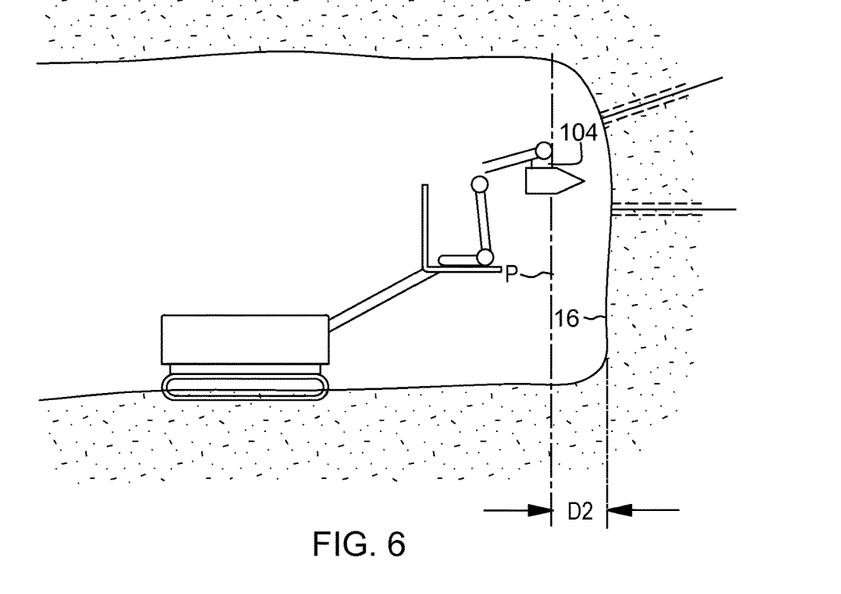
FIG. 6 is a diagrammatic illustration of the imaging system of FIG. 1 in a first position for undertaking the second scanning path.
Figure 7:
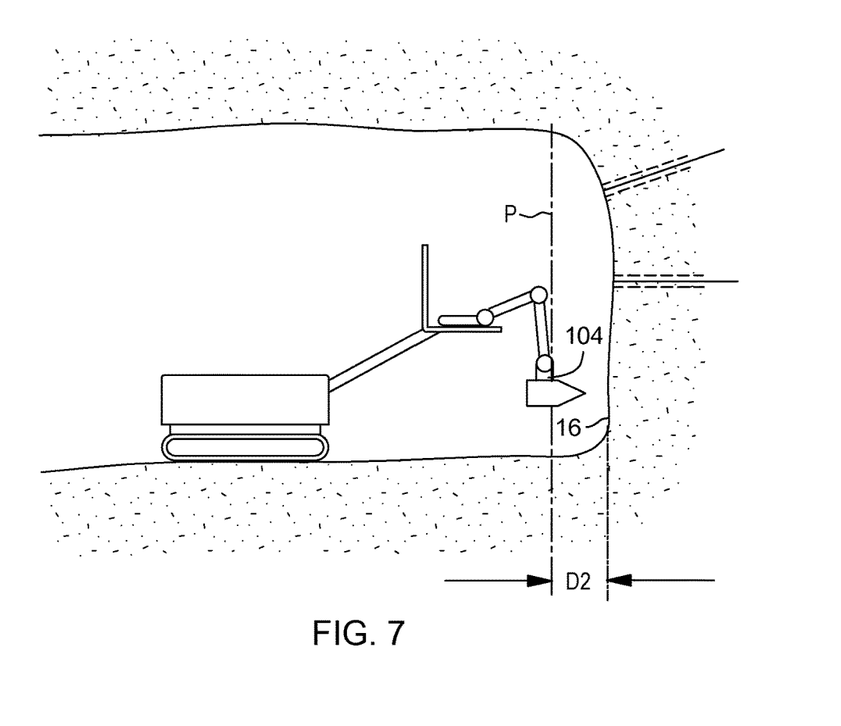
FIG. 7 is a diagrammatic illustration of the imaging system of FIG. 1 in a second position for undertaking the second scanning path.

Based on the first representation such as the bounding box 300, coordinates of the corners of the bounding box, or other suitable merged data from the first representation, a second scanning path is determined or generated. In one embodiment, a second scanning path S as shown in FIG. 5 may include scanning about a non-fixed location such as scanning across a plane P. For example, as shown in FIGS. 6 and 7, the second scanning path may result in camera system 104 being scanned across plane P such as a plane parallel to wall 16 and with camera system 104 disposed perpendicular to wall 16. The boundary of the second scanning path of plane P may be spaced from the surfaces of the bounding box so that the camera system and portions of the robot do not contact the environment such as the ceiling, the ground, and the sidewalls. In another aspect, a predetermined drill hole map, used by an operators for drilling the holes in the wall, may be used for generating the second scanning path. For example, a plurality of the holes may be located it the first representation and aligned with the holes in the predetermined drill hole map. The outer drill holes of the predetermined hole drill map may be used for the outer scanning portions of the second scanning path.

The second representation of the environment may be different from the first representation of the environment. For example, the second representation may be obtained about a non-fixed location, at a second resolution different from the first resolution, and/or at a second scanning speed different from the first scanning speed. In one embodiment, the first representation may be obtained from a low resolution prescan imaging that is generally quickly obtained of the environment whereas the second representation may obtained from a high resolution detailed imaging that is obtained of the environment. As noted above, the second imaging is inhibited from collision with an obstruction such as the ceiling, the ground, and/or the sidewalls in the environment.

The environment may include a plurality of features such as spaced-apart features. The technique of the present disclosure may include using the second representation of the environment to determine an aspect of the plurality of features. For example, in connection with mining, as noted above in one embodiment the wall may include a plurality of elongated drilled holes which are to be filed or charged with an explosive. The second more detailed representation of the wall may be used to locate the holes in the wall and determine the angle of an axis X (FIG. 1) of the hole. Such a second, for example, more detailed representation may be used with the robot and end effector to automatically install a charge in each drilled hole.

Figure 8:
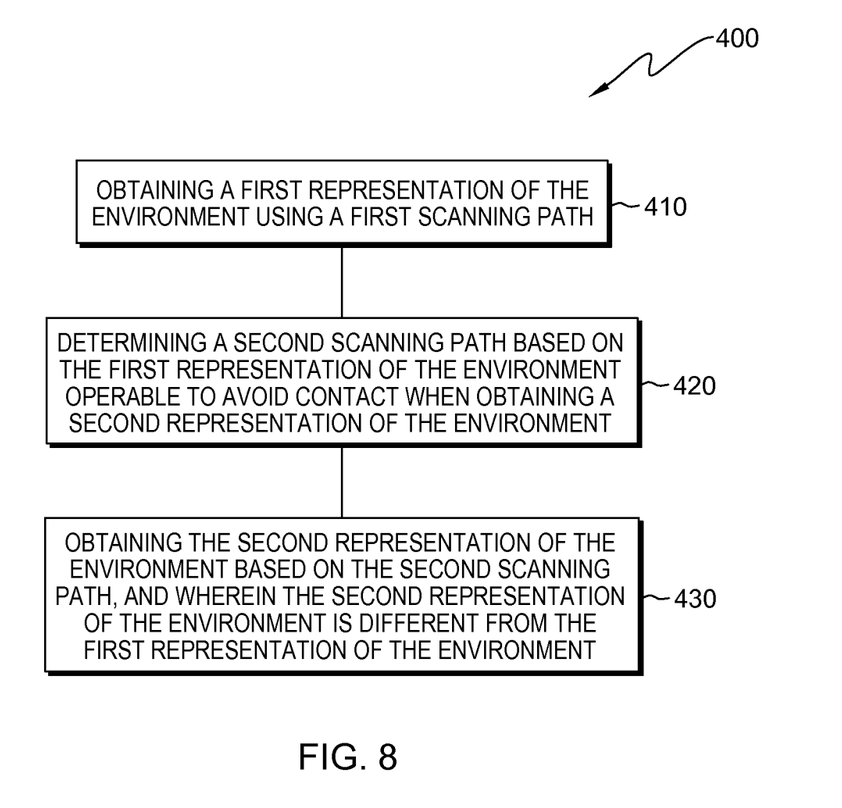
FIG. 8 is a flowchart of a method for representing an environment in accordance with aspects of the present disclosure.

FIG. 8 illustrates a flowchart of a computer-implemented method 400, which may be implemented by imaging system 100, for automatically scanning and representing an environment with collision avoidance in accordance with aspects of the present disclosure. In this embodiment, computer-implemented method 400 includes at 410, obtaining a first representation of the environment using a first scanning path, and at 420, determining a second scanning path based on the first representation of the environment operable to avoid contact when obtaining a second representation of the environment. At 430, the second representation of the environment is obtained based on the second scanning path, and wherein the second representation of the environment is different from the first representation of the environment.

Figure 9:
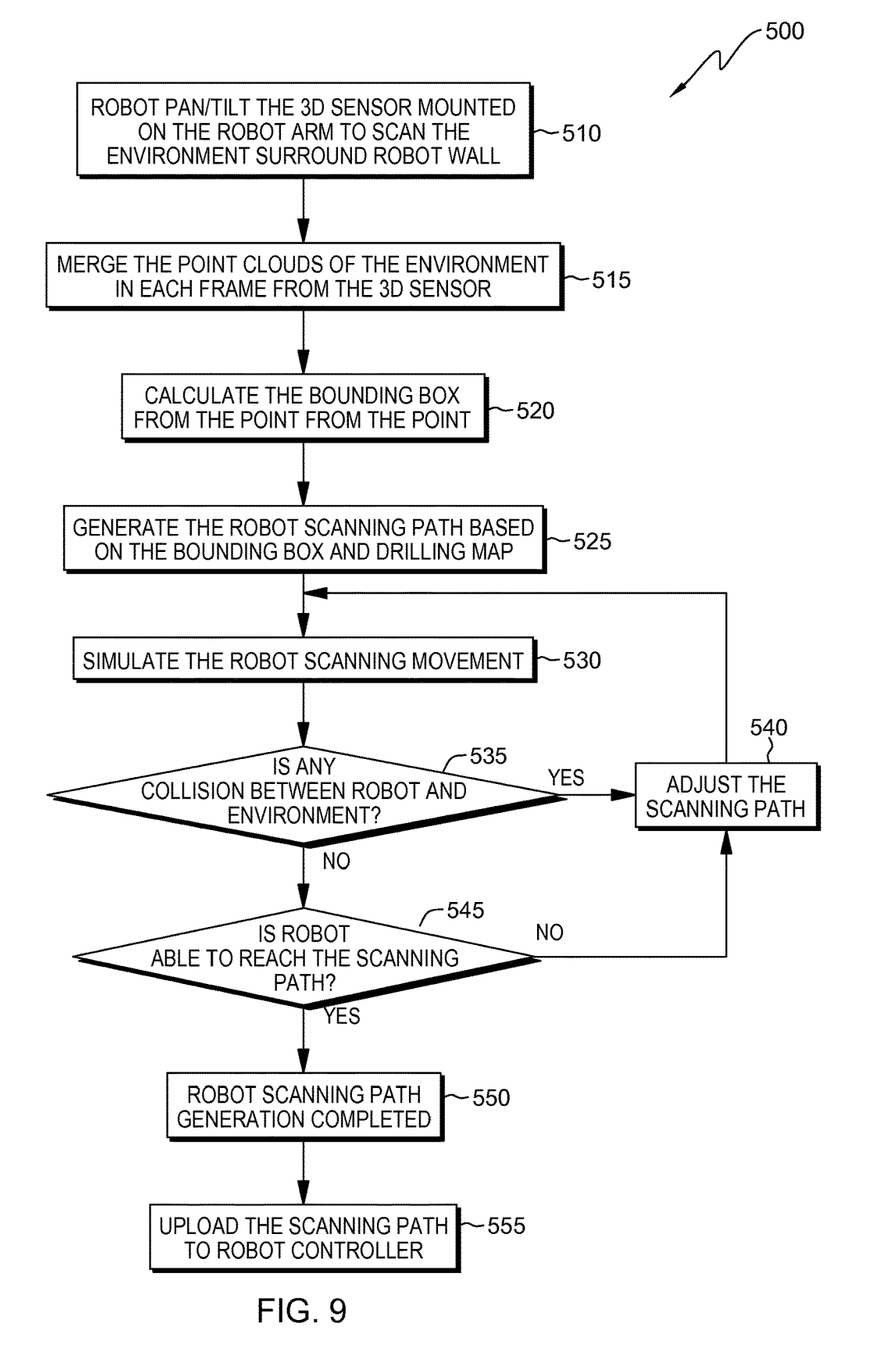
FIG. 9 is a flowchart of another method for representing an environment in accordance with aspects of the present disclosure.

FIG. 9 illustrates a flowchart of a computer-implemented method 400, which may be implemented by imaging system 100, for automatically generating a second scanning path of an environment in accordance with aspects of the present disclosure. At 510, a robot pans and/or tilts the 3D sensor mounted on the robot art to scan the environment surrounding the robot, and at 515, includes merging the point clouds of the environment in each frame from the 3D sensor. At 520, a bounding box is calculated from the merged point clouds. At 525, a robot scanning path is generated based on the bounding box and a drilling map (e.g., the drill hole pattern shown in FIG. 2). A simulation of the robot scan movement is performed at 530, and a determination is made whether there is a collision between the robot and the environment at 540. If the simulation results in a collision, the scanning path is adjusted at 535. If the simulation does not result in a collision, a check is made whether the robot is able to reach the scanning path at 545. If not, the process returns to 540 to adjust the scanning path if the robot is able to reach path 545. The robot scanning path generation is complete at 550. At 555, the scanning path is uploaded dot the robot controller.

Figure 10:
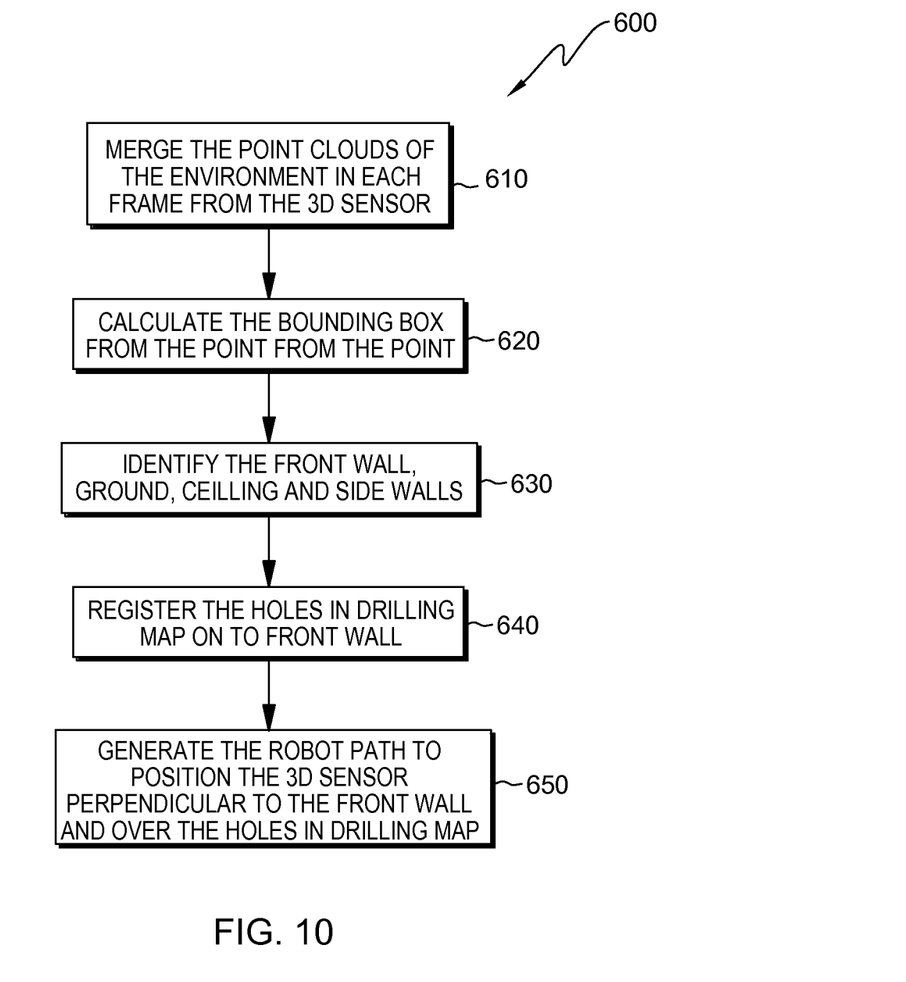
FIG. 10 is a flowchart of a method for determining the second scanning path in accordance with aspects of the present disclosure.

FIG. 10 illustrates a flowchart of a computer-implemented method 600, which may be implemented by imaging system 100, for automatically generating a second scanning path of an environment in accordance with aspects of the present disclosure. At 610, the point clouds of the environment in each frame from the 3D sensor are merged. At 620, a bounding box is calculated from the merged point clouds. At 630, the front wall, the ground, the ceiling, and the sidewalls are identified. At 640, the holes in a drilling map are registered on the front wall, and at 650, a robot scanning path is generated to position the 3D sensor perpendicular to the front wall and over the holes in the drilling map.

The technique of the present disclosure may be employed in the robotic charging application in mining. For example, a task of the robot may include, in addition to imaging as described above, inserting the explosive material pump hose into the holes drilled in the wall. In order to accurately position the tip of a pump hose into a hole, the robot system needs to detect the hole position and hole orientation.

Advantages of the technique of the present disclosure may include the robot first rotating such as panning and/or tilting a 3D sensor from a safe distance to scan the environment. This so called preview scan may be a quick and low resolution scan of a 3D sensor providing a point cloud of the environment. The point clouds in each frame from the 3D sensor are merged to reconstruct the 3D scene.

The system may process the point cloud of the 3D scene to calculate out the bounding box and identify the front wall, the sidewalls, the ground, and the ceiling. Then the system may generate a scanning path for hole detection based on the so called preview scan alone or with the use of a predetermined drill hole map of the holes (i.e., drilling map or plan used by an operator in drilling the holes). Robot motion along the scanning path may be performed in a simulation with the 3D scene point cloud and tool mounted on the robot and checked in simulation for collision, reachability and singularity. If there is any collision, reachability or singularity problem detected, the scanning will be adjusted and tested again in the simulation. Once the scanning path is verified in the simulation, the robot program with the scanning path will be uploaded to the robot controller so that the robot system is ready to perform the scanning task. Such a technique may provide an automatically generated collision free scanning path avoiding collision with the environment such as the front wall, the sidewalls, the ceiling, and the ground, efficient robot 3D scanning for hole detection, improvement in the quality of the point cloud for hole detection, and making a robot pump hose insertion in charging application for mining faster and more reliable. Techniques other than the bounding box, such as the well-known convex hull, mesh, etc., may also be used to represent the wall from the point cloud.

In order to detect hole position and hole orientation, the robot system may perform the second scanning to move a 3D sensor along the front wall to scan each hole and generate the point cloud of the holes and front wall. The 3D sensor desirably scans the holes at a specified angle, such as perpendicular to the wall, in order to capture the point cloud of the holes for processing and detecting hole position and hole orientation. Hole orientation can be determined based on the calibration of the axis of the cylinder which represents the hole from the point cloud data. The detected holes may be registered to a drilling map. Using a 2D sensor and image processing in the harsh environment in mining having uncontrolled lighting condition, dust, water, etc. may not produce desirable results. This can be overcome by using in the present technique employing a 3D sensor and a 3D point cloud processing system as described herein.

In addition, a robotic system employing the techniques of the present disclosure may also be employed with or be a part of a robotic system providing 3D visual servoing to accurately position the hose at the entrance of each drill hole. For example, an end of arm tooling may handle the hose, e.g., an end effector and an actuator to push the hose forward and retract the hose back, as well as rotate the hose to overcome obstructions in the hole during hose insertion. Such a robotic system may include a magazine for automating prime to detonator assembly, remote teleoperation to intervene the automated charging process, and record and report the status of the each charging hole. Benefits of such a robotic system may include making the charging process safer, ergonomic, and cost efficient by removing operators from the production front. Additional functions may include remotely supervising the chagrining process, and monitoring the production by measuring front wall geometric changes.

With reference again to FIG. 3, FIG. 3 depicts an example system 100 to incorporate and use aspects described herein. System 100 includes robot 102, robot controller 150, operator computer system 170, and backend computer system 160, all coupled via communication links 140a-140d. The physical locations of these components relative to one another can vary. For instance, they may be as close together as a few feet or as far apart as thousands of miles or more.

Communication links 140*a*-140*d* between the components may be realized by any of various wireless and/or wired technologies (e.g. fiber-optic/radio/cable on different types and layers of data protocols). In some embodiments, one or more such communication links includes existing infrastructure, such as existing Ethernet installations operating over one or more local or wide area network(s). A non-limiting list of additional communication link technologies includes wireless-LAN (WLAN), Bluetooth, ZigBee, near-field, or other wireless links, point-to-point radio systems or laser-optical systems, and satellite communication links, as examples.

Robot 102 may be any type of robot, such as an industrial robot offered by ABB Inc. of Auburn Hills, Mich., U.S.A., as an example. Example robots have several (usually 4, 5, 6 or 7) degrees of freedom enabling them to perform any of various tasks usually characterized by the movement and/or manipulation of objects. In this regard, a robot refers in its broadest sense to an assembly that has multiple degrees of freedom.

Robot functions are served by different, and typically application-specific, components, some of which are depicted as part of the example robot 102 of FIG. 3. It should be understood that robot 102 includes additional components omitted from FIG. 3 for convenience purposes, and further that a robot to incorporate/use aspects described herein need not necessarily include each of the components depicted in FIG. 3.

Camera system 104 provides imaging functions enabling the robot to 'see' physical objects in its environment. Camera system 104 may be realized by proprietary and/or application-specific imaging device(s) or commercial off-the-shelf (COTS) offerings providing 2-dimensional, 3-dimensional, and/or depth-sensing imaging capabilities. An example COTS product is the Kinect® motion controller offered by Microsoft Corporation. Vision assistance system 106 is another type of sensor system providing vision capabilities for the robot. It can also include imaging device(s) for imaging objects of the environment to assist in proximity or other spatial determinations. In some embodiments, the camera system 104 is mounted on the robot at or near a 'head' thereof providing a roughly 1st-person perspective of the robot's activities, while the vision assistance system 106 includes multiple cameras mounted around the robot 102 and imaging the robot 102 and its surroundings to provide a 3rd-person perspective of robot activities with respect to the surrounding objects.

Other sensor/sensor devices 108 are included to provide additional sensing capabilities. The particular additional sensors may be dependent on the types of tasks the robot will perform when in operation. A non-limiting list of additional sensors are microphones, position sensors, proximity sensors, and force/pressure sensors, as examples. Some sensor devices can include data processing capabilities. So-called smart sensors are usually, though not always, connected directly to robot controller 150 via communication link(s). Other types of sensors that lack on-board data processing capability to process captured data may provide data to a separate data processing device (such as robot controller 150, backend computer system 160, operator computer system 170, and/or another computer system, not pictured) to process the sensor device output.

Some sensors may be local to or remote from the robot 102 or robot controller 150. Remote sensor devices can provide input signals to the robot controller 150 that the robot controller 150 uses to control the robot 102 in performance of work described herein.

Some sensors that are mounted either on the robot 102 or at other locations can detect, or provide data that is processed to detect, obstacles that enter into or otherwise appear in the workspace of the robot 102. Sensor information including data about the detected obstacle can be processed and used by robot controller 150 for position and other geometric information. With respect to a smart sensor, a data processing capability thereof can fully or partially process sensor information and transfer to the robot controller 150 only the relevant data about the obstacle. In other types of sensors that lack data processing capability, the sensor information can be processed by another data processing device as described above and provided to robot controller 150.

The robot 102 can also include actuator(s) or other devices (collectively referred to as actuation devices 110) incorporated into, mounted to, or next to, the robot 102 to provide object manipulation capabilities for manipulating or moving objects. Example actuation devices 110 include grippers, claws, fixtures, suction devices, conveyors, twisting mechanisms, hose and/or wire feeder mechanisms, and specialized equipment like medical tools, welding guns, or spraying guns. Many actuation devices are more generally referred to as robot "end effectors".

Robot controller 150 provides motion data to robot 102 to control actions thereof. Motion data includes commands, as examples, sent to and received by component(s) of the robot that cause the components to drive robot actions, movement to other locations, and other activities. Accordingly, robot controller 150 may be a computer system having programs (i.e. instructions, program code) that execute to provide motion data to the robot 102 to control motion of the robot 102 to perform work. For instance, the robot 102 may hold a tool (not shown) used to perform work on a stationary or moving workpiece (also not shown), or may hold the workpiece to have work performed on it by an appropriate tool, as examples. As further examples, the robot 102 may include a feeder component to feed a hose or other object into holes or other spaces to accomplish a task such as planting explosive material. The feeder component may include a twisting mechanism configured to twist the hose or other object in order to more reliably reach desired locations.

Sensor information provided to the robot controller 150 directly or indirectly, such as via a data processing component to process sensor data, may be used to generate a safety zone in which the robot 102 may work. When obstacles enter into the workspace of the robot 102 based on repositioning the obstacle or the robot, a map can be built to inform the robot controller 150 of the safety zone. Additionally, information from sensor(s) or other components, such as components 104, 106 and/or 108, can be used by the robot controller to build a distance map and/or ⅔-dimensional map. In some examples, raw sensor information is processed to build the map.

Robot controller 150 is in communication with operator computer system 170 used in controlling and/or observing robot behavior. The operator computer system 170 can show on a display thereof actual data about robot motion and attached processes, for example, camera images, acoustic feedback, and sensor values. Additionally, operator computer system 170 can act as a data processing device for sensor information, and can process data in both directions (i.e. data to/from the sensors). Operator computer system 170 may be implemented by any computer system desired, for instance an industrial personal computer or a programmable logic controller, as examples.

Some embodiments may feature at least partial control of the robot 102 by operator computer system 170. The operator computer system 170 can play a role in dictating, selecting, building, and/or providing commands or other signals to the robot 102 and/or robot controller 150 to cause the robot 102 to perform actions. In some examples, the operator computer system 170 has at least one teleoperation input device, such as joysticks or stylus-type devices that the operator can use to create continuous motion signals (position and/or speed signals) that can be provided to the robot 102 directly or via robot controller 150. Some teleoperation input devices can provide feedback to an operator based on, for example, input from sensors of the robot 102. Feedback can be any kind of feedback that can be sensed by an operator. An example is haptic or force feedback that causes a vibration in a joystick or a stylus.

The operator computer system can also include a safety enable device, such as a three-position switch, to provide the ability for the operator to enable or disable power to the robot 102 and/or other components of the system 100.

Backend computer system 160 can provide additional local or remote computing resources to support robot controller, operator computer system 170, and/or robot 102. In this regard, control of the robot 102 and/or other processes supporting robot tasks may be more demanding than can be handled by the front-end systems. A local or remote backend facility may be provided by backend computer system 160, and the front-end components can off-load work to the backend computer system 160. By way of specific example, processing of image data, especially 3-dimensional image data, may present a significant burden on the robot 102, sensors thereof, and/or robot controller 150. The image data may be provided in part or whole to backend computer system 160 for processing and results can be provided back to the robot controller 150 or another component for use in robot processes.

As mentioned prior, components of system 100 need not be located adjacent to each other. Backend computer system 160 may be located on-site or offsite, for instance as a remote cloud-based computing facility that offers a web-based data-processing solution.

One or more of the foregoing components of system 100 may be encompassed by, or included in, one or more other of the foregoing components. Similarly, functionality described above of a given component may be incorporated into a different component of the foregoing components. Backend compute resources provided by backend computer system 160, for example, may be included in the robot controller 150 or operator computer system 170, or vice versa. In some embodiments, functionality of robot controller 150 and/or operator computer system 160 is incorporated into backend computer system 160.

Processes described herein may be performed by one or more computer systems or other processing devices. An example computer system to incorporate and use aspects described herein is depicted and described with reference to FIG. 11. Computer system 700 includes one or more processors 702, memory 704, and one or more I/O devices 706, which may be coupled to each other by busses and other electrical hardware elements (not depicted). Processor(s) 702 include any appropriate hardware component(s) capable of implementing functions, for instance executing instruction(s) (sometimes alternatively referred to as code, firmware and/or software) retrieved from memory 704. Execution of the instructions causes the computer system 700 to perform processes, functions, or the like, such as those described herein supporting control and/or operation of a robot.

In some examples, aspects described herein are performed by a plurality of homogenous or heterogeneous computer systems coordinated to collectively perform processes, functions, or the like, such as those described herein supporting control and/or operation of a robot.

Figure 11:
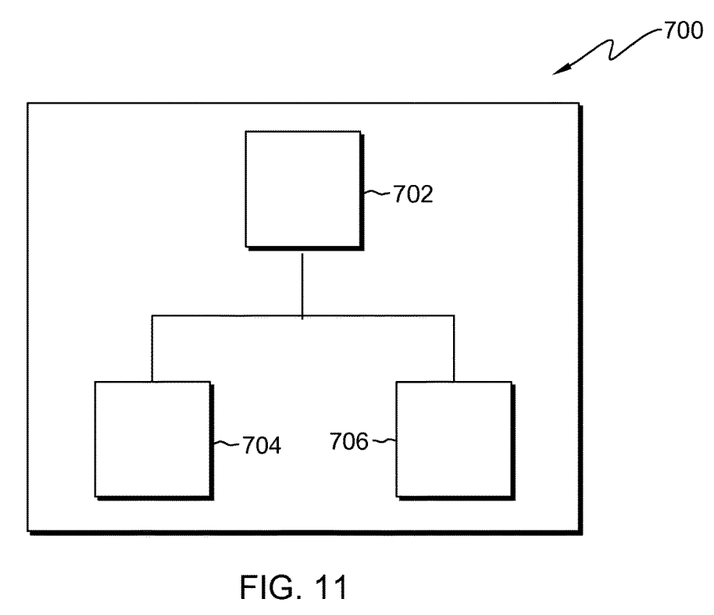
FIG. 11 depicts a computer system incorporating one or more aspects of the present disclosure.

Memory 704 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 704 may be volatile, non-volatile, or a combination of the two. As a specific example, memory 704 includes one or more hard drives and one or more random-access memory (RAM) devices for, respectively, non-volatile and volatile storage of data. Example programs stored by memory include an operating system and applications that run on the operating system, such as specialized applications to perform functions described herein.

I/O device(s) 706 include hardware and/or software components that support input and output of data to/from computer system 700. I/O device(s) 706 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 706 also include, but are not limited to, I/O controllers and hardware and software supporting data communication with the aforementioned components, such as network, graphics, and/or audio controller(s). An example I/O device 706 is a network adapter for communication of data between computer system 700 and another component, such as another computer system, across communication links. Examples include Ethernet, cable, and/or fiber-based communications links passing data packets between computer system 700 and other systems across one or more networks, such as the Internet. Other example I/O devices 706 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 12:
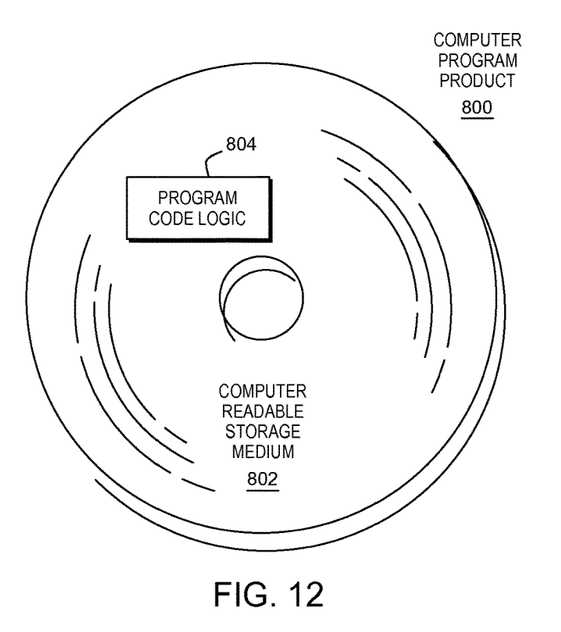
FIG. 12 depicts a computer program product incorporating one or more aspects of the present disclosure.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 12, an example computer program product 800 is depicted that includes, for instance, one or more computer readable storage media 802 to store computer-readable program code means, logic and/or instructions 804 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described in flowcharts and/or block diagrams described herein. Thus, each block, or combinations of blocks, of the flowchart illustrations and/or block diagrams depicted and described herein can be implemented, in some embodiments, by computer program instructions. Behaviors/functions specified or performed by one or more blocks may occur in a different order than depicted and/or described, or may occur simultaneous to, or partially/wholly concurrent with, one or more other blocks.

The terminology used herein is for the purpose of describing particular embodiments only and is not limiting of the invention. As used herein, the singular forms "a", "an" and "the" include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not presented.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The invention claimed is:

1. A computer-implemented method comprising:
obtaining a first representation of an environment employing a 3D camera coupled to a robotic arm based on a first scanning path;
simulating a second scanning path of the 3D camera comprising movements of the robotic arm using the first representation of the environment;
determining the 3D camera cannot reach a portion of the second scanning path so as to complete the second scanning path in response to simulating the second scanning path;
adjusting the second scanning path in response to determining the robotic arm cannot reach the portion of the second scanning path;
obtaining a second representation of the environment employing the 3D camera based on the adjusted second scanning path; and
wherein the second representation of the environment is different from the first representation of the environment.

2. The computer-implemented method of claim 1 wherein the obtaining the first representation comprises obtaining the first representation of the environment using the first scanning path about a first region, and obtaining the second representation comprises obtaining the second representation of the environment using the second scanning path about a second region, and wherein the second region is greater than the first region.

3. The computer-implemented method of claim 1 wherein the obtaining the first representation comprises obtaining the first representation of the environment at a first distance from the environment, at a first resolution, or at a first scanning speed, and the obtaining the second representation comprises obtaining the second representation of the environment at a second distance from the environment different from the first distance, at a second resolution different from the first resolution, or at a second scanning speed different from the first scanning speed.

4. The computer-implemented method of claim 1 comprising determining the second scanning path based on the first representation of the environment operable to avoid contact with the environment when obtaining a second representation of the environment, wherein the determining the second scanning path comprises determining the second scanning path off site from the obtaining the first representation and the obtaining the second representation, and wherein the first representation includes a point cloud generated from an output of the 3D camera.

5. The computer-implemented method of claim 4 wherein the determining the second scanning path comprises simulating the second scanning path to confirm avoidance of contact with the environment.

6. The computer-implemented method of claim 1 wherein obtaining the first representation comprises obtaining a first plurality of frames of data of a plurality of portions of the environment, and merging together data from the first plurality of frames of data the plurality of portions of the environment.

7. The computer-implemented method of claim 4 wherein the determining the second scanning path comprises using a bounding box or a collision free path planner.

8. The computer-implemented method of claim 1 wherein the environment comprises a plurality of features, and further comprising determining an aspect of the plurality of features.

9. The computer-implemented method of claim 8 further comprising determining the second scanning path to avoid contact with the environment based on a predetermined map of the features.

10. The computer-implemented method of claim 1 wherein the 3D camera includes a robotically supported movable imager.

11. The computer-implemented method of claim 1 wherein the environment comprises a rock wall having a plurality of holes defining axes for receiving charges for mining, and the rock wall surrounded by sidewalls, a ceiling, and/or a ground.

12. The computer-implemented method of claim 11 wherein the determining the second scanning path is further based on a predetermined drill hole map of the plurality of holes.

13. A system comprising:
a memory; and
a physical processor in communications with the memory, wherein the system is configured to perform a method comprising:
obtaining a first representation of an environment employing a 3D camera coupled to a robotic arm based on a first scanning path by receiving a set of frames from the 3D camera and generating a point cloud using the set of frames;
determining a second scanning path of the 3D camera based on the first representation of the environment operable to avoid contact when obtaining a second representation of the environment;
simulating the second scanning path comprising robot arm movements;
determining the 3D camera cannot reach a portion of the second scanning path so as to complete the second scanning path in response to simulating the second scanning path;
generating a third scanning path in response to determining the robotic arm cannot reach the portion of the second scanning path;
obtaining a second representation of the environment employing the 3D camera based on the third scanning path; and
wherein the second representation of the environment is different from the first representation of the environment.

14. A non-transitory computer readable storage medium readable by a processor comprising:
instructions stored on the non-transitory computer readable storage medium for execution by the processor for performing a method comprising:
obtaining a first representation of an environment employing a 3D camera coupled to a robotic arm based on a first scanning path by merging a set of point clouds generated by the 3D camera;
determining a second scanning path based on the first representation of the environment operable to avoid contact with the environment when obtaining a second representation of the environment;
simulating the second scanning path including a plurality of robot arm movements;
determining the robot arm cannot reach a portion of the second scanning path so as to complete the second scanning path in response to simulating the second scanning path;
generating a third scanning path of the 3D camera in response to determining the robot arm cannot reach the portion of the second scanning path;
obtaining a second representation of the environment based on the third scanning path; and
wherein the second representation of the environment is different from the first representation of the environment.

* * * * *